US010179385B2

(12) United States Patent
Xia et al.

(10) Patent No.: US 10,179,385 B2
(45) Date of Patent: Jan. 15, 2019

(54) CLAMPING MECHANISM OF ROTATION TABLE DEVICE

(71) Applicant: FANUC CORPORATION, Yamanashi (JP)

(72) Inventors: Zhizhen Xia, Yamanashi (JP); Zheng Tong, Yamanashi (JP); Hiroki Tezuka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 51 days.

(21) Appl. No.: 15/338,448

(22) Filed: Oct. 31, 2016

(65) Prior Publication Data

US 2017/0136593 A1     May 18, 2017

(30) Foreign Application Priority Data

Nov. 12, 2015   (JP) .................... 2015-222421

(51) Int. Cl.
*B23Q 16/10*   (2006.01)
*B23Q 1/26*    (2006.01)
*F16D 55/02*   (2006.01)
*F16D 65/18*   (2006.01)
*F16D 55/32*   (2006.01)
*F16D 121/04*  (2012.01)
(Continued)

(52) U.S. Cl.
CPC .......... *B23Q 16/105* (2013.01); *F16D 55/02* (2013.01); *F16D 55/32* (2013.01); *F16D 65/18* (2013.01); *F16D 2055/0058* (2013.01); *F16D 2121/04* (2013.01); *F16D 2121/16* (2013.01); *F16D 2125/582* (2013.01)

(58) Field of Classification Search
CPC .. F16D 55/02; F16D 2121/04; F16D 2121/16; B23Q 16/10; B23Q 16/105
See application file for complete search history.

(56) References Cited

U.S. PATENT DOCUMENTS 5,526,715 A * 6/1996 Swann ................. B23Q 16/102
                                          192/223.1
7,418,889 B2 * 9/2008 Nitta ....................... B23Q 1/28
                                          74/813 L
(Continued)

FOREIGN PATENT DOCUMENTS

JP   2002-18678 A   1/2002
JP   2009-18391 A   1/2009
(Continued)

OTHER PUBLICATIONS

Office Action in JP Application No. 2015-222421, dated Aug. 8, 2017, 5 pp.

*Primary Examiner* — Thomas J Williams
*Assistant Examiner* — James K Hsiao
(74) *Attorney, Agent, or Firm* — Hauptman Ham, LLP

(57) ABSTRACT

A clamping mechanism of rotation table device includes a shaft fixing a workpiece to an end portion thereof, a brake disk fixed to the shaft, and a clamping mechanism clamping or unclamping the brake disk by driving a piston. The clamping mechanism includes a plate spring fixed to a rear plate fixed to a casing and a piston and urging the piston in a clamping direction at all times by an elastic deformation restoring force and the plate spring is fixed to the rear plate or the piston through an annular plate.

7 Claims, 6 Drawing Sheets

(51) Int. Cl.
  *F16D 121/16* (2012.01)
  *F16D 125/58* (2012.01)
  *F16D 55/00* (2006.01)

(56) References Cited

U.S. PATENT DOCUMENTS

| | | | | |
|---|---|---|---|---|
| 8,398,061 | B2* | 3/2013 | Tatsuda | B23Q 16/102 269/216 |
| 2009/0235783 | A1* | 9/2009 | Duane | B23Q 16/102 74/813 C |
| 2010/0123278 | A1* | 5/2010 | Tatsuda | B23Q 16/102 269/57 |
| 2010/0175505 | A1* | 7/2010 | Tatsuda | B23Q 16/102 74/813 L |
| 2010/0319487 | A1* | 12/2010 | Tatsuda | B23Q 16/102 74/813 L |
| 2012/0011964 | A1* | 1/2012 | Tatsuda | B23Q 1/525 74/813 R |
| 2016/0243660 | A1* | 8/2016 | Nishimura | B23Q 16/105 |

FOREIGN PATENT DOCUMENTS

| | | |
|---|---|---|
| JP | 2010-52356 A | 3/2010 |
| JP | 2012-202484 A | 10/2012 |

* cited by examiner

CLAMPING MECHANISM OF ROTATION TABLE DEVICE

RELATED APPLICATIONS

The present application claims priority to Japanese Patent Application Number 2015-222421 filed Nov. 12, 2015, the disclosure of which is hereby incorporated by reference herein in its entirety.

BACKGROUND OF THE INVENTION

1. Field of the Invention

The present invention relates to a clamping mechanism of a rotation table device that disposes a rotation table device used in a machining tool in a stationary state.

2. Description of the Related Art

Heretofore, a worm gear mechanism having an in-reversible rotation characteristic has generally been employed as a rotation driving mechanism of a rotation table device (see, for example, Japanese Patent Application Laid-Open No. 2002-18678). However, in the case of the worm gear structure, a worm and a worm wheel mesh each other and a slight backlash exists. For that reason, even when a rotation table is held in a stationary state, rattling occurs by the amount corresponding to the backlash and the angle of the rotation table indexed cannot have a desirable value. As a result, it is difficult to achieve a high machining accuracy for a workpiece held on the rotation table.

Therefore, a clamping mechanism is used to keep the rotation table device at a stationary state when the rotation table device is stopped. For example, Japanese Patent Application Laid-Open No. 2012-202484 discloses a rotation table device provided with a brake disk which is fixed to a shaft transmitting a rotational movement from a rotational driving device of a direct drive structure to a table and rotates integral with the shaft and a piston which is provided so that the brake disk can be sandwiched between a fixed member and the piston. Then, when an air pressure is applied to the piston so that the brake disk is sandwiched between the piston and the fixed member, the movement of the shaft integrated with the brake disk is clamped by a friction force generated between the brake disk and the fixed member so that the rotation table device connected to the shaft is kept in a stationary state.

In this way, in the rotation table device of the rotational driving device of the direct drive structure, a mechanism for disposing the table in a stationary state does not exist other than a motor generating power. For this reason, the clamping mechanism is needed.

In a mechanism for pressing the brake disk against the fixed member to clamp the brake disk, generally, an urging mechanism is provided to urge the brake disk in a clamping or unclamping direction even in a state where air pressure or hydraulic pressure is not applied. In many cases, a plate spring is used as the urging mechanism. Here, the plate spring includes two functions; that is, a function of generating an urging force in a clamping or unclamping direction by a return of the spring due to elastic deformation in a state where air pressure or hydraulic pressure is not applied, and a function of increasing a clamping torque during a clamping operation by the piston. Here, the plate spring needs to be fixed to the piston and a rear plate of the rotation table device by the use of a bolt or the like. However, since the plate spring is bent during the clamping/unclamping operation and a rotation torque is added during the clamping operation, stress concentrates on the fixing portion and thus the fixing portion tends to be easily cracked due to aging.

SUMMARY OF THE INVENTION

Accordingly, an object of the invention is to provide a clamping mechanism capable of reducing concentrating stress applied to a fixing portion of a plate spring.

A clamping mechanism of rotation table device according to the invention includes: a shaft which is rotatably provided inside a casing and an end portion of which a workpiece or a jig is fixed to, and; a brake disk provided in the shaft in a manner such that the brake disk cannot rotate with respect to the shaft. The clamping mechanism is configured to clamp the brake disk so that the shaft is not rotatable and unclamp the brake disk so that the shaft is rotatable. The clamping mechanism of rotation table device comprises: a piston that is driven by a working fluid in a direction in which the brake disk is clamped or unclamped; and a plate spring, fixed to the piston and a rear plate fixed to the casing, which urges the piston in the clamping or unclamping direction at all times by an elastic deformation restoring force. The plate spring is fixed to any one of or both the rear plate and the piston through an annular plate.

The annular plate may be provided between the plate spring and a fixing member fixing the plate spring to the piston or the rear plate.

The fixing member may be configured as a fixing bolt, and the annular plate may be provided between the plate spring and a head part of the fixing bolt.

The annular plate may be provided between the plate spring and the rear plate or a fixing target of the piston.

In the clamping mechanism of rotation table device according to the present invention, the plate spring is repeatedly bent while clamping or unclamping the rotation table device, and stress concentrates on the fixing portion for fixing the plate spring in the bent state. However, since the plate spring is fixed to the fixing portion through an annular plate, the concentrating stress applied to the fixing portion of the plate spring is reduced and thus the crack and the plastic deformation of the fixing portion of the plate spring can be prevented.

BRIEF DESCRIPTION OF THE DRAWINGS

The forgoing and other objects and feature of the invention will be apparent from the following description of preferred embodiments of the invention with reference to the accompanying drawings, in which.

DETAILED DESCRIPTION OF THE PREFERRED EMBODIMENTS

Figure 1:
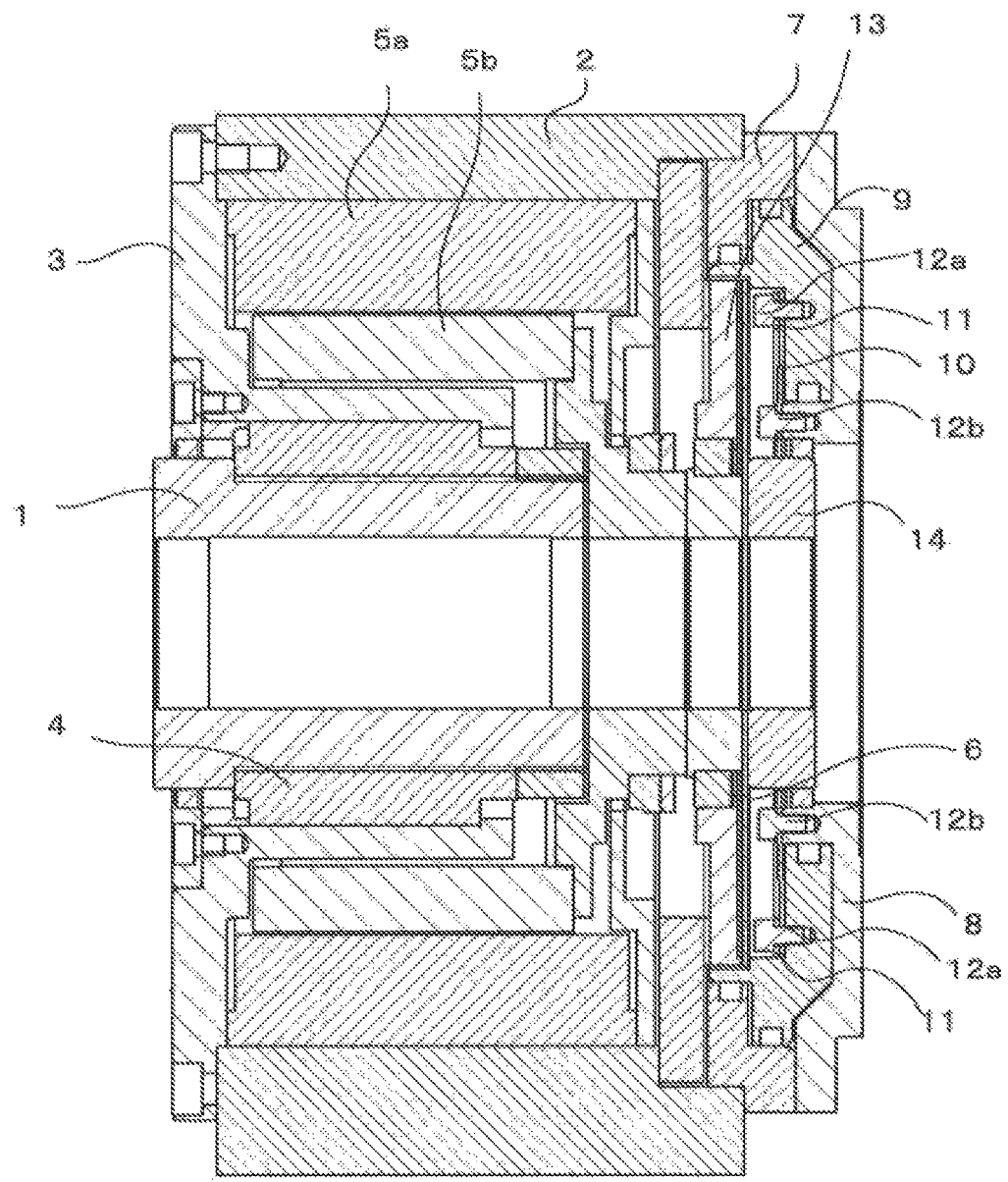
FIG. 1 is a cross-sectional view showing a face passing through a center line of a rotation table device including a direct drive mechanism with a clamping mechanism according to an embodiment of the present invention.

An index rotation table device including a direct drive mechanism with a clamping mechanism according to an embodiment of the present invention will be described with reference to FIG. 1.

A shaft 1 of the rotation table device is rotatably supported by a housing 3 fixed to a casing 2 through a bearing 4. A workpiece or jig (not shown) is removably fixed to the shaft at the end portion thereof. A stator 5a of a motor for rotationally driving the shaft 1 is fixed to the housing 3 and a rotor 5b of the motor is attached to the shaft 1 while being rotatably supported by the casing 2.

A cylinder 7 and a rear plate 8 are also fixed to the casing 2. A brake disk 6 is sandwiched between an end face of the shaft 1 and an end face of an attachment member 14. With this configuration, the brake disk 6 is coupled to the shaft 1 so as not to be rotatable and rotates along with the shaft 1 with respect to the casing 2. The piston 9 is disposed in a groove shape formed by the cylinder 7 and the rear plate 8 fixed to the casing 2. Further, the clamping member 13 fixed to the casing 2 faces a disk face of the brake disk 6.

Figure 2:
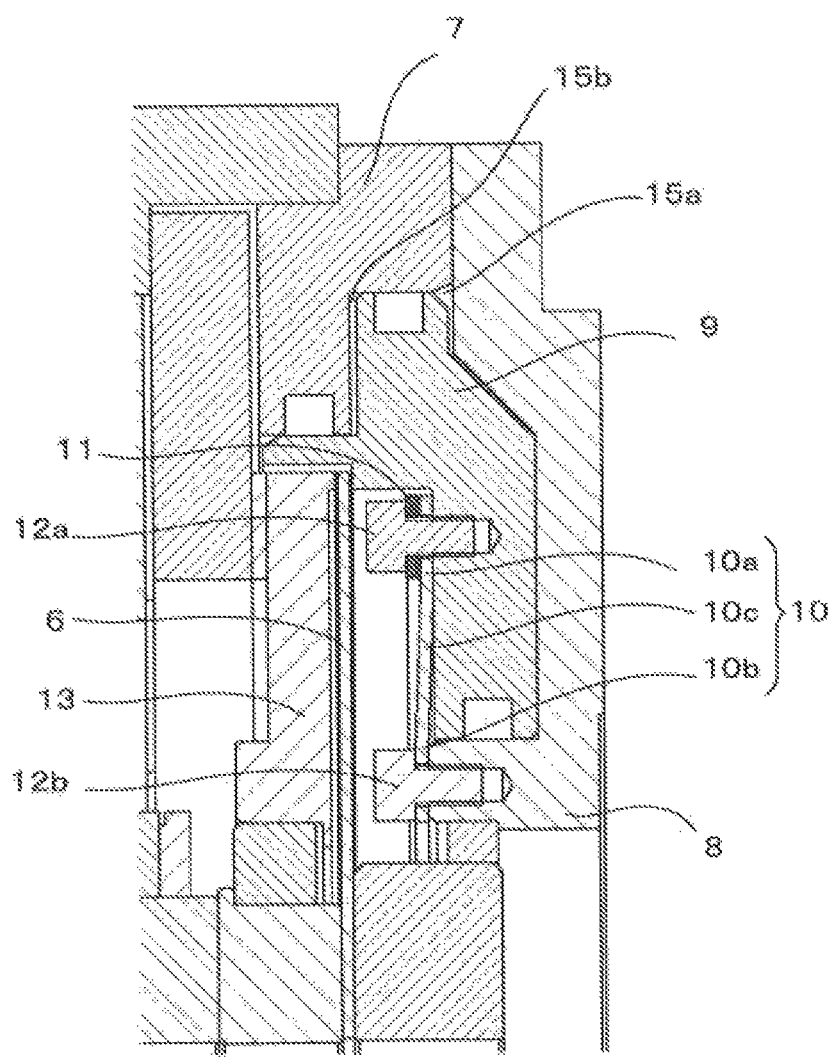
FIG. 2 is an enlarged view showing a fixing portion of a spring disk (a plate spring) of the rotation table device shown in FIG. 1.

A spring disk 10 which is a plate spring includes a first fixing portion 10a, a second fixing portion 10b, and a support portion 10c which supports the first fixing portion 10a and the second fixing portion 10b, as shown in an enlarged view of FIG. 2. In the spring disk 10, the first fixing portion 10a is fixed to the piston 9 by the first fixing bolt 12a of the fixing part and the second fixing portion 10b is fixed to the rear plate 8 by the second fixing bolt 12b. With this configuration, the rotation of the piston 9 with respect to the shaft 1 is prevented. Further, the spring disk 10 is configured to urge the brake disk 6 in a clamping direction at all times by a repelling force caused by the elastic deformation of the support portion 10c supporting the first and second fixing portions 10a and 10b. In addition, the repelling force caused by the elastic deformation of the spring disk 10 may be used to urge the brake disk 6 in an unclamping direction at all times.

In the present invention, since stress concentrates on the vicinity of the fixing portion of the spring disk 10, the spring disk 10 is fixed to the piston 9 and the rear plate 8 through an annular plate 11 so that the concentration of stress is distributed.

In the examples shown in FIGS. 1 and 2, the annular plate 11 is fixed while being disposed between the first fixing portion 10a of the spring disk 10 and (the head part of) the first fixing bolt 12a serving as the fixing part.

The piston 9 is able to move forward and backward inside the groove-shaped space. The inside of the groove-shaped space is divided into a clamping air chamber 15a and an unclamping air chamber 15b through the piston 9 so that the piston is movable by compressed air serving as a working fluid. A control of air into these two air chambers 15a and 15b is performed by an electromagnetic valve (not shown).

When a clamping instruction is input, the electromagnetic valve is operated so that the compressed air flows into the clamping air chamber 15a and the compressed air of the unclamping air chamber 15b is discharged to the outside of the unclamping air chamber 15b and the piston 9 is operated toward the brake disk 6 so that the brake disk 6 is sandwiched by the piston 9 and the clamping member 13 fixed to the casing 2. As a result, the shaft 1 becomes not rotatable.

When an unclamping instruction is input, on the contrary, the electromagnetic valve is operated so that the compressed air flows into the unclamping air chamber 15b and the compressed air of the clamping air chamber 15a is discharged to the outside of the clamping air chamber 15a and the piston 9 moves in the reverse direction so that the brake disk 6 is released from the piston 9 and the clamping member 13. As a result, the shaft 1 is rotatable.

Further, in the embodiment, the compressed air is used as the working fluid for driving the piston 9, but a different working fluid such as working oil may be used.

The annular plate 11 is disposed between the first fixing portion 10a of the spring disk 10 and the head part of the first fixing bolt 12a as shown in FIG. 2. With this configuration, since the concentration of stress on the vicinity of the bolt of the spring disk can be distributed during a clamping or unclamping operation, it is possible to prevent a crack or plastic deformation of the first fixing portion 10a of the spring disk 10.

Figure 3A:
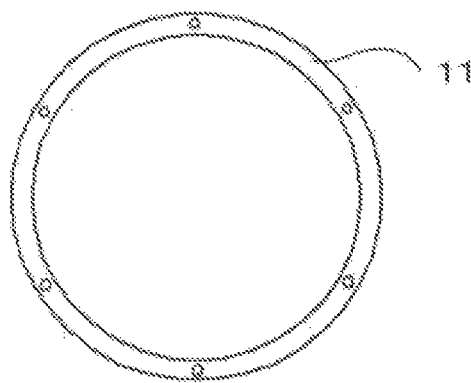
FIGS. 3A to 3C are top views respectively showing a shape example (in a top view) of an annular plate disposed between a fixing part (a head part of a fixing bolt) and the fixing portion of the spring disk of FIG. 2.
Figure 3B:
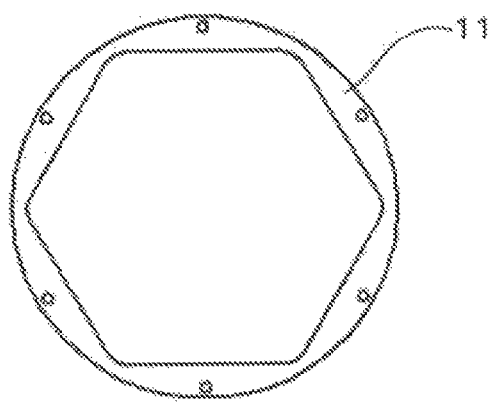
Figure 3C:
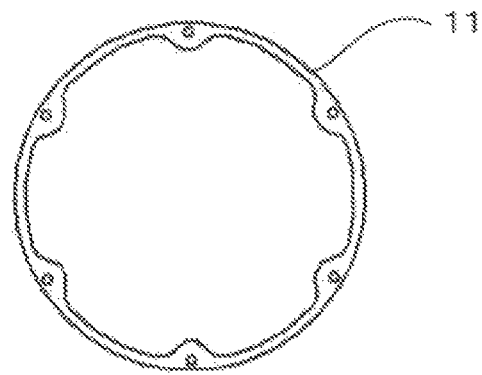

FIGS. 3A to 3C respectively show examples of the annular plates 11 having different shapes. Each of these annular plate 11 has a plurality of holes through which a fixing part such as a fixing bolt is allowed to pass.

Further, in FIG. 2, the annular plate 11 is disposed between the first fixing portion 10a of the spring disk 10 (a portion of the spring disk 10 which is fixed to the piston 9 by means of the first fixing bolt 12a) and the head part of the first fixing bolt 12a. However, instead of such configuration, the annular plate 11 may be disposed between the second fixing portion 10b of the spring disk 10 (a portion of the spring disk 10 which is fixed to the rear plate 8 by means of the second fixing bolt 12b) and the head part of the second fixing bolt 12b or between the spring disk 10 and the rear plate 8 or the piston 9 of the fixing target fixing the spring disk 10.

Figure 4:
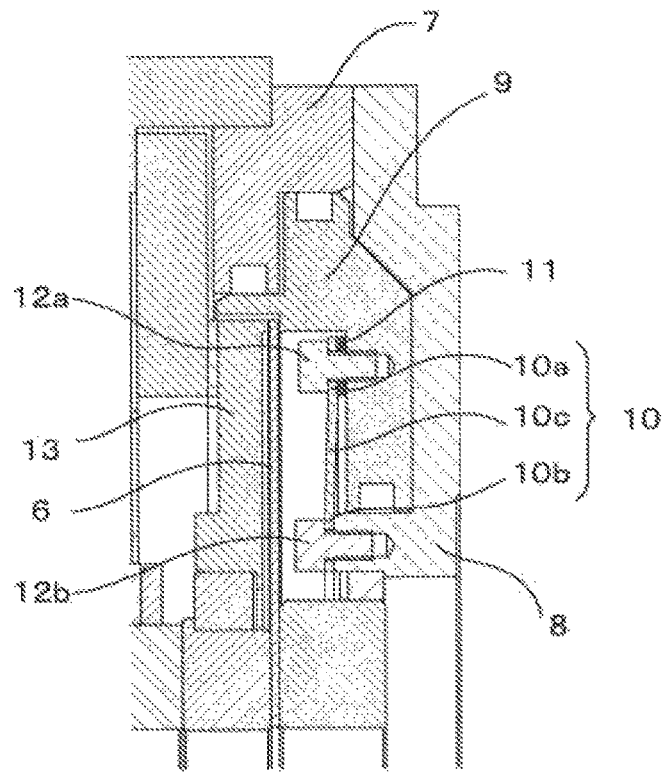
FIG. 4 shows an example in which the annular plate shown in FIG. 2 is disposed between a piston and a first fixing portion of a spring disk.

FIG. 4 shows an example in which the annular plate 11 is disposed between the first fixing portion 10a of the spring disk 10 and the piston 9. The first fixing portion 10a of the spring disk 10 is fixed to the piston 9 by means of the first fixing bolt 12a.

Figure 5:
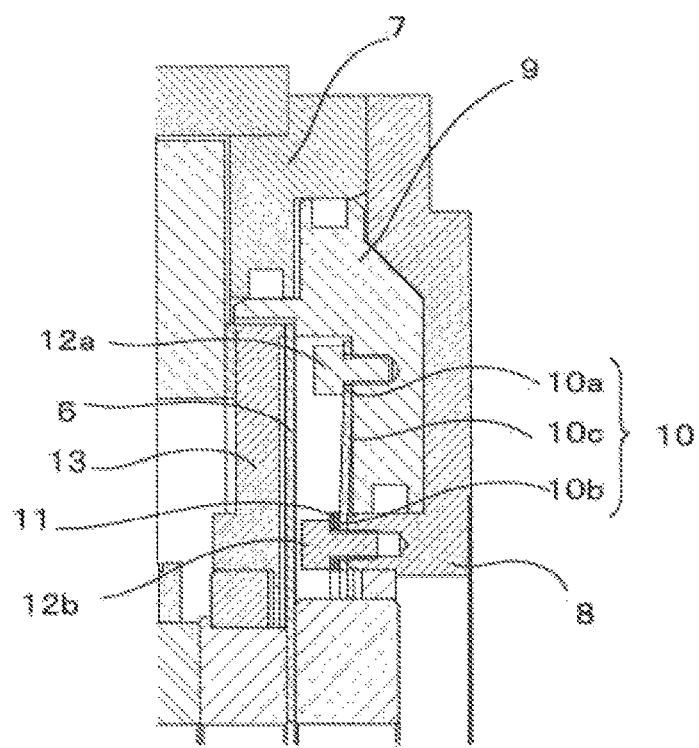
FIG. 5 shows an example in which the annular plate shown in each of FIGS. 3A to 3C is disposed between a second fixing portion of a spring disk and a head part of a second fixing bolt.

FIG. 5 shows an example in which the annular plate 11 is disposed between the second fixing portion 10b of the spring disk 10 and the head part of the second fixing bolt 12b. The second fixing portion 10b of the spring disk 10 is fixed to the rear plate 8 by means of the second fixing bolt 12b.

Figure 6:
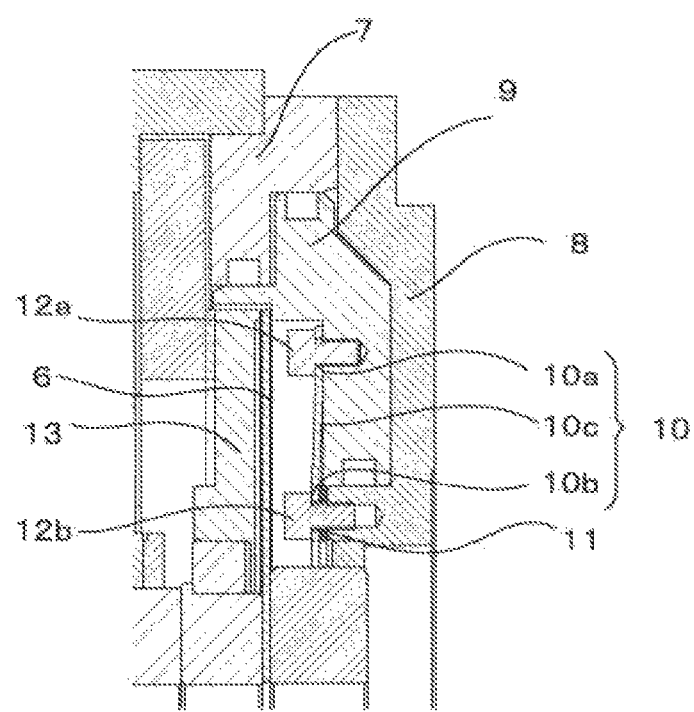
FIG. 6 shows an example in which the annular plate shown in each of FIGS. 3A to 3C is disposed between a second fixing portion of a spring disk and a rear plate.

FIG. 6 shows an example in which the annular plate 11 is disposed between the second fixing portion 10b of the spring disk 10 and the rear plate 8. The second fixing portion 10b of the spring disk 10 is fixed to the rear plate 8 by means of the second fixing bolt 12b.

Figure 7:
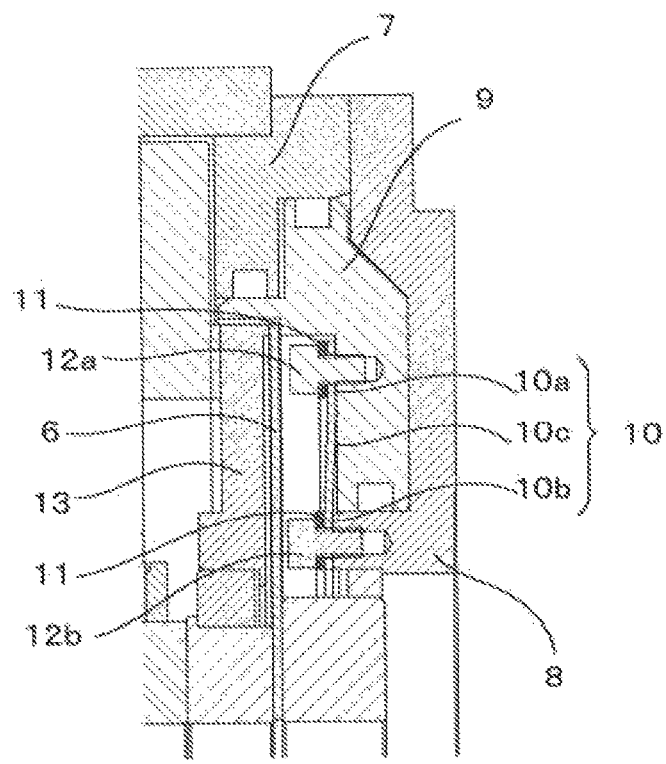
FIG. 7 shows an example in which the annular plate shown in each of FIGS. 3A to 3C is disposed between a first fixing portion of a spring disk and a head part of a first fixing bolt and between a second fixing portion of the spring disk and a head part of a second fixing bolt.

FIG. 7 shows an example in which the annular plate 11 is disposed between the first fixing portion 10a of the spring disk 10 and the head part of the first fixing bolt 12a and also between the second fixing portion 10b of the spring disk 10 and the head part of the second fixing bolt 12b. The first fixing portion 10a of the spring disk 10 is fixed to the piston 9 by means of the first fixing bolt 12*a* and the second fixing portion 10*b* is fixed to the rear plate 8 by means of the second fixing bolt 12*b*.

Figure 8:
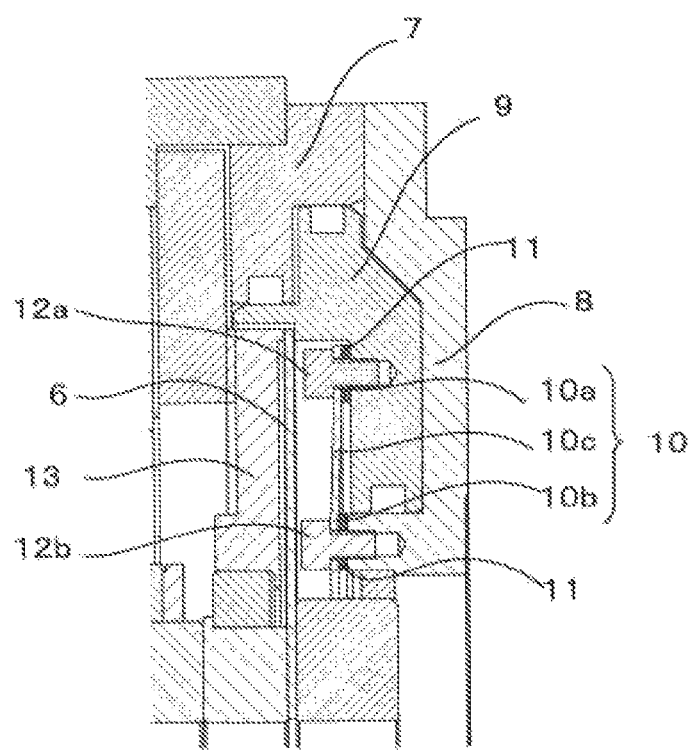
FIG. 8 shows another example in which the annular plate shown in each of FIGS. 3A to 3C is disposed between a first fixing portion of a spring disk and a piston and between a second fixing portion of the spring disk and a rear plate.

FIG. 8 shows an example in which the annular plate 11 is disposed between the first fixing portion 10*a* of the spring disk 10 and the piston 9 and also between the second fixing portion 10*b* of the spring disk 10 and the rear plate 8. The first fixing portion 10*a* of the spring disk 10 is fixed to the piston 9 by means of the first fixing bolt 12*a* and the second fixing portion 10*b* is fixed to the rear plate 8 by means of the second fixing bolt 12*b*.

As shown in FIGS. 2 to 8, when the annular plate 11 is disposed at any position to which the spring disk 10 is fixed, the concentration of stress on the vicinity of the fixing portion can be distributed and thus a crack or plastic deformation of the fixing portion of the spring disk 10 can be prevented.

In the above-described embodiment, an example has been described in which the present invention is applied to the rotation table device of the direct drive mechanism, but the present invention can be also applied to the rotation table device of a different driving mechanism such as a driving mechanism of a worm gear structure. Further, the present invention can be also applied to the rotation table device without the driving mechanism.

The invention claimed is:

1. A clamping mechanism of a rotation table device, wherein
the rotation table device comprises:
a shaft which is rotatably provided inside a casing and an end portion of which a workpiece or a jig is fixed to, and
a brake disk provided on the shaft in a manner such that the brake disk cannot rotate with respect to the shaft,
the clamping mechanism is configured to
clamp the brake disk so that the shaft is not rotatable, and
unclamp the brake disk so that the shaft is rotatable,
the clamping mechanism comprises:
a piston that is driven by a working fluid in a direction in which the brake disk is clamped or unclamped; and
a plate spring which is fixed to (i) the piston and (ii) a rear plate fixed to the casing, and which urges the piston in the clamping or unclamping direction at all times by an elastic deformation restoring force, wherein
the plate spring is fixed to any one of or both the rear plate and the piston through an annular plate.

2. The clamping mechanism according to claim 1, wherein
the annular plate is provided between the plate spring and a fixing member fixing the plate spring to the piston or the rear plate.

3. The clamping mechanism of rotation table device according to claim 2, wherein
the fixing member is configured as a fixing bolt, and
the annular plate is provided between the plate spring and a head part of the fixing bolt.

4. The clamping mechanism according to claim 1, wherein
the annular plate is provided between (i) the plate spring and (ii) the rear plate or the piston.

5. The clamping mechanism according to claim 1, wherein
the plate spring is fixed to at least one of the rear plate and the piston through the annular plate provided at a fixing portion where the plate spring is fixed to the rear plate or to the piston.

6. The clamping mechanism according to claim 1, wherein
the annular plate includes
a first annular plate provided between the plate spring and a first fixing member fixing the plate spring to the piston, and
a second annular plate provided between the plate spring and a second fixing member fixing the plate spring to the rear plate.

7. The clamping mechanism according to claim 1, wherein
the annular plate includes
a first annular plate provided between the plate spring and the piston, and
a second annular plate provided between the plate spring and the rear plate.

* * * * *